(12) United States Patent
Kim et al.

(10) Patent No.: US 8,107,323 B1
(45) Date of Patent: Jan. 31, 2012

(54) BOOMER FOR MARINE SEISMIC SURVEY

(75) Inventors: Young Jun Kim, Daejeon (KR); Sung Ryul Shin, Busan (KR); Jong Hwa Chun, Daejeon (KR); Dong Geun Yoo, Daejeon (KR)

(73) Assignee: Korea Institute of Geoscience and Mineral Resources (Kigam), Daejeon (KR)

( * ) Notice: Subject to any disclaimer, the term of this patent is extended or adjusted under 35 U.S.C. 154(b) by 0 days.

(21) Appl. No.: 13/205,124

(22) Filed: Aug. 8, 2011

(30) Foreign Application Priority Data

Jan. 19, 2011 (KR) .......................... 10-2011-0005648

(51) Int. Cl.
*G10K 11/18* (2006.01)
(52) U.S. Cl. ...................................................... 367/165
(58) Field of Classification Search ................... 367/173, 367/165, 16, 15
See application file for complete search history.

(56) References Cited

U.S. PATENT DOCUMENTS

| 4,552,086 A | * | 11/1985 | Boe et al. | 367/153 |
| 5,138,582 A | * | 8/1992 | Furu | 367/16 |
| 2003/0160546 A1 | * | 8/2003 | Osborn | 310/369 |
| 2004/0221442 A1 | * | 11/2004 | Osborn | 29/594 |

FOREIGN PATENT DOCUMENTS

JP 2007-236005 A 9/2007

* cited by examiner

*Primary Examiner* — Daniel Pihulic
(74) *Attorney, Agent, or Firm* — Echelon Law Group, PC

(57) ABSTRACT

Provided is a boomer that is a type of a seismic source generator for marine seismic survey. In the boomer for marine seismic survey according to the exemplary embodiment of the present invention, a plurality of transducer coupling parts capable of separating and coupling a transducer are disposed on a bottom of a board floating on a surface of water, the transducer coupling parts are disposed along a straight line L forming left and right center of gravity of the board, and a transducer coupling member for mounting a transducer is provided. Further, the support is mounted on the bottom of the board, the transducer coupling part is disposed on the support, and the support is formed to control a distance from a bottom point of the board to the transducer coupling part.

4 Claims, 5 Drawing Sheets

“BOOMER FOR MARINE SEISMIC SURVEY”

CROSS-REFERENCE TO RELATED APPLICATIONS

This application claims priority under 35 U.S.C. §119 to Korean Patent Application No. 10-2011-0005648, filed on Jan. 19, 2011 in the Korean Intellectual Property Office, the disclosure of which is incorporated herein by reference in its entirety.

TECHNICAL FIELD

The present invention relates to a boomer that is a type of a seismic source generator for marine seismic survey.

BACKGROUND

Marine seismic survey for exploring undersea natural resources such as petroleum, natural gas, gas hydrate, or the like, or bedrock investigation for marine construction such as undersea pipeline and cable burial, undersea tunnel, undersea storage equipment, bridge, or the like, has been performed.

For the purpose of resource exploration, a need exists for a large-capacity air gun operated at a low frequency and a long streamer to several km in length so as to understand a geological structure to several km in depth.

However, since the marine seismic survey for the purpose (generally, referred to as "engineering purpose") of marine construction such as undersea pipeline and cable burial, undersea tunnel, undersea storage equipment, bridge, or the like, is performed to understand a subsurface geological structure of a shallow area, a seismic source generator such as a small-sized air gun of a high frequency, a sparker, a boomer, or the like, and a streamer (a single channel streamer or a small-sized multi-channel streamer) are used.

Further, it is difficult to perform the exploration for the engineering purpose using a large prober when water is shallow in a survey area. Therefore, the exploration for the engineering purpose is mainly performed by a small ship, a fishing boat, or the like, and needs to be economically performed within a budget.

A marine seismic survey data acquisition system may be configured to include a GPS, a seismic source generator, a streamer, a recording system, or the like.

The GPS for the marine seismic survey performs positioning of ships or all the equipment while performing data acquisition. Further, a differential GPS (DGPS) has been used to perform accurate positioning.

The seismic source generator artificially generates seismic signals. A representative example of the seismic source generator used in marine survey for the engineering purpose may include an air gun, a sparker, a boomer, or the like.

As the related art relating thereto, there is Japanese Patent Laid-Open Publication No. 2007-236005 (Sep. 13, 2007).

Generally, the broader the frequency band of the seismic source generator, the higher the resolution becomes. However, the seismic source generator is not transmitted to a deep softground.

The seismic source receiver is an apparatus that receives the seismic signals artificially generated by the seismic source generator.

The recording system is an apparatus that converts and stores the received signals from analog to digital.

The air gun used for the marine petroleum exploration, which is an apparatus suddenly discharging high-pressure air into the water to generate a sound wave, has been the most prevalently used for the marine survey since it has a frequency of several tens of Hz.

However, the air gun requires numerous accessories such as a compressor capable of continuously generating and supplying the high-pressure air, a large-capacity generator, or the like, a working space, and high cost, which is not appropriate for the engineering exploration using a small ship.

The above-mentioned sparker, which generates a spark by high-voltage current applied between two electrodes mounted into the water, has a type that generates vapor bubbles at the time of generating spark to generate a primary pulse.

When the bubbles are cooled until they are shrunk, secondary bubble pulses are generated. The secondary bubble pulses have a frequency of 20 to 200 Hz, which has been mainly used to investigate a seafloor or a strata of which the depth is shallow.

The boomer instantly discharges voltage to generate energy, which is very suitable for the engineering exploration.

The boomer is a type that generates an acoustic pulse caused by the deformations of the piezoelectric transducer when electric energy is discharged to a coil and eddy current is generated to the coil from a transducer (referred to as 'plate').

Since the boomer has a frequency of 400 to 1300 Hz, the boomer is mainly used to investigate the seafloor or the strata of which the depth is shallow, similar to the sparker, but since the boomer includes a larger amount of high frequency components than the sparker, the boomer may obtain a more precise seismic cross section.

FIG. 1 is a schematic diagram for explaining marine seismic survey using a boomer.

The boomer having one transducer and four transducers generating signals has been used. The boomer having one transducer is generally referred to as a bubble pulser and the boomer having four transducers are generally referred to as 'quad pulser'.

The bubble pulser has one transducer, which is relatively easy in view of the movement and operation. However, the bubble pulser has smaller energy than a water level at a place where the water is deep, thereby degrading the quality of seismic reflection data.

Since the quad pulser has four transducers, the seismic reflection is clearly shown even at the place where the water is deep, but is heavy (about 200 kg to about 20 kg per one transducer), such that it is difficult to move and operation the quad pulse by manpower.

Although there is a need to provide the appropriate number of transducers according to situations in consideration of survey purpose, water level, working space, working conditions, costs, or the like, while solving the difficulty in the above-mentioned movement and operation, the boomer according to the related art may not satisfy them.

When forcibly removing some of the four transducers included in the boomer according to the related art, the center of gravity of the boomer may be biased to one direction, or the like, such that it may be difficult to separate and use some transducers in the boomer according to the related art.

SUMMARY

An object of the present invention is to provide a boomer capable of increase efficiency of marine seismic survey capable of solving difficulty in movement and operation while obtaining excellent exploration results, by appropriately coping with situations such as exploration purpose, water level, working space, working conditions, or the like.

According to the exemplary embodiment of the present invention, a boomer for marine seismic survey according to the exemplary embodiment of the present invention can be used for marine seismic survey working by mounting an appropriate number of transducers according to situations such as exploration purpose, water level, working space, working conditions, or the like by disposing a plurality of transducer coupling parts under a straight line crossing the left and right center of gravity of a board so as not to greatly change the center of gravity of the boomer even though some of a plurality of transducers, which are implemented to be able to be separated and coupled from and with each other on a board floating on a surface of water, are separated and coupled from and with each other.

That is, it is possible to perform structural change working by controlling the number of provided transducers according to situations.

Further, it is possible to control a distance from the board to the transducer so as to perform work in consideration of a state of a sea level such as a wave height, floating matters, or the like, and a water level.

By the above-mentioned configuration, the present invention can perform working in consideration of situations such as exploration purpose, water level, working space, working conditions, or the like, thereby increasing efficiency of marine seismic survey such as obtaining excellent exploration results and solving difficulty in movement and operation, or the like.

DETAILED DESCRIPTION OF EMBODIMENTS

Figure 1:
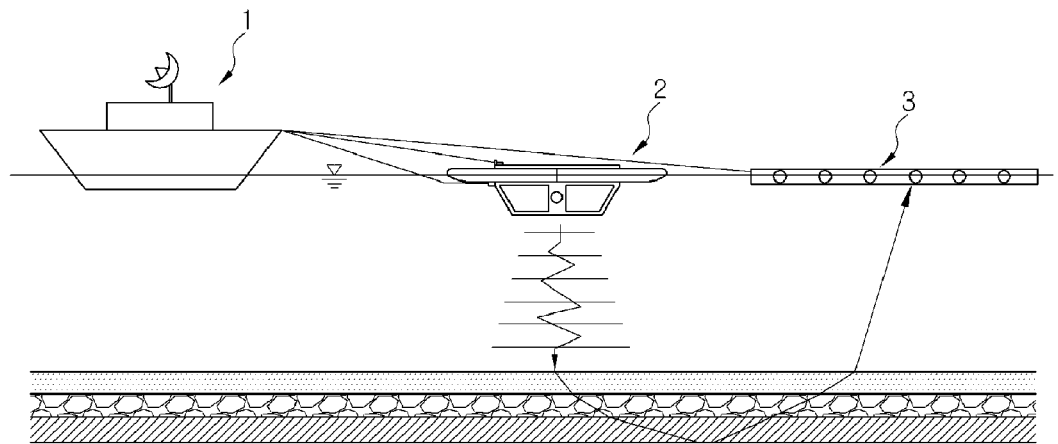
FIG. 1 is a schematic diagram for explaining marine seismic survey using a boomer.
Figure 2:
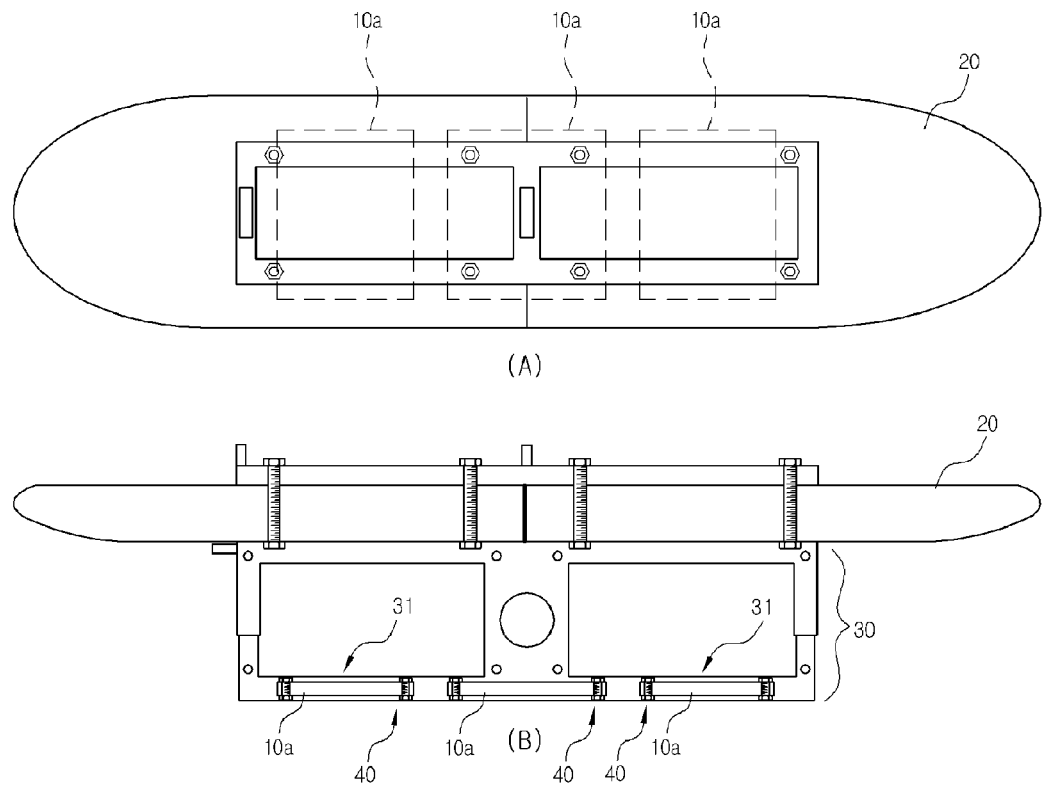
FIG. 2 is a schematic diagram for explaining a boomer for marine seismic survey according to an exemplary embodiment of the present invention.
  A: Plan view
  B: Front view
Figure 3:
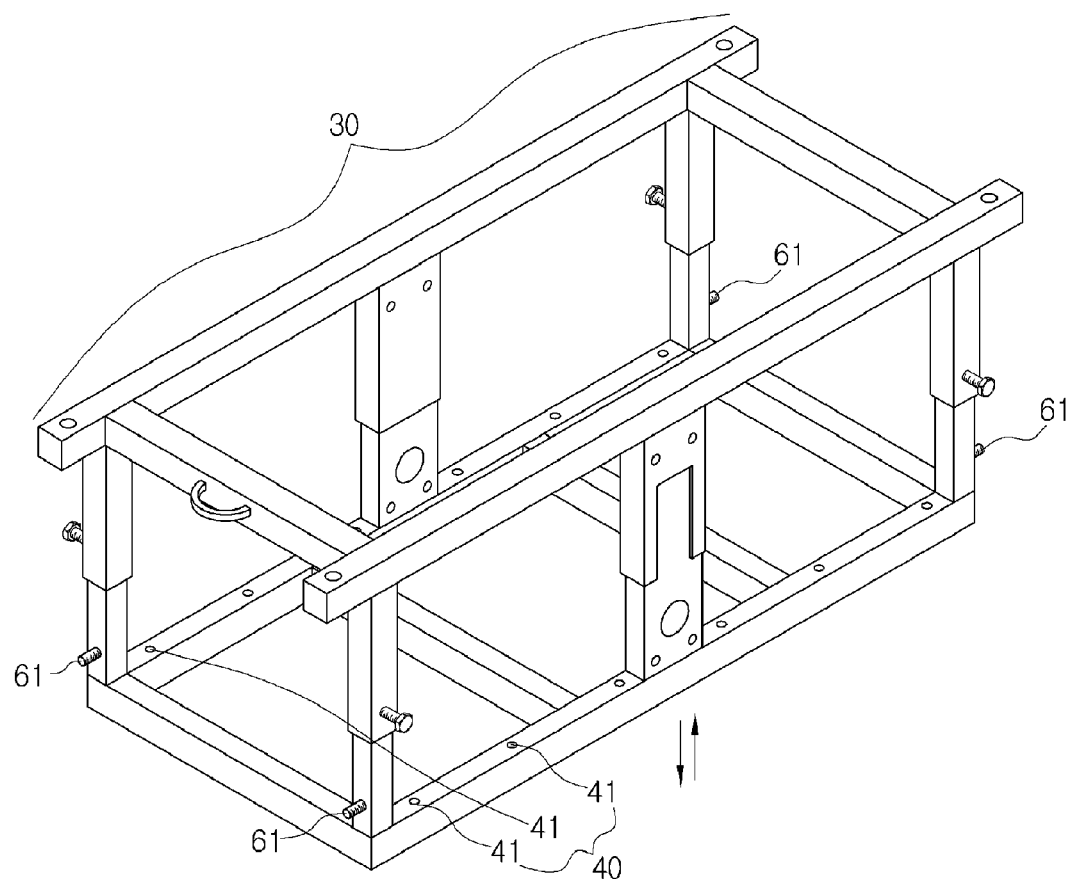
FIG. 3 is a schematic perspective view of a support that is a component of the exemplary embodiment of the present invention.
Figure 4:
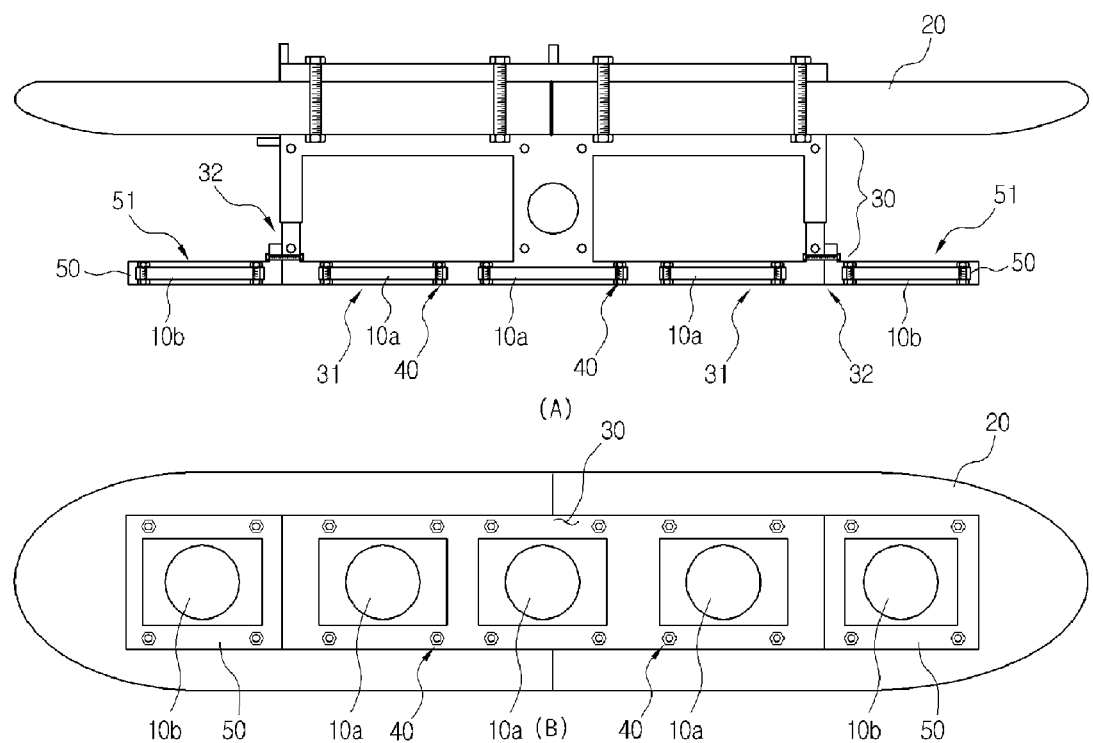
FIG. 4 is a schematic diagram for explaining a boomer for marine seismic survey with which an additional mounting frame is coupled, according to an exemplary embodiment of the present invention.
  A: Front view
  B: Bottom view
Figure 5:
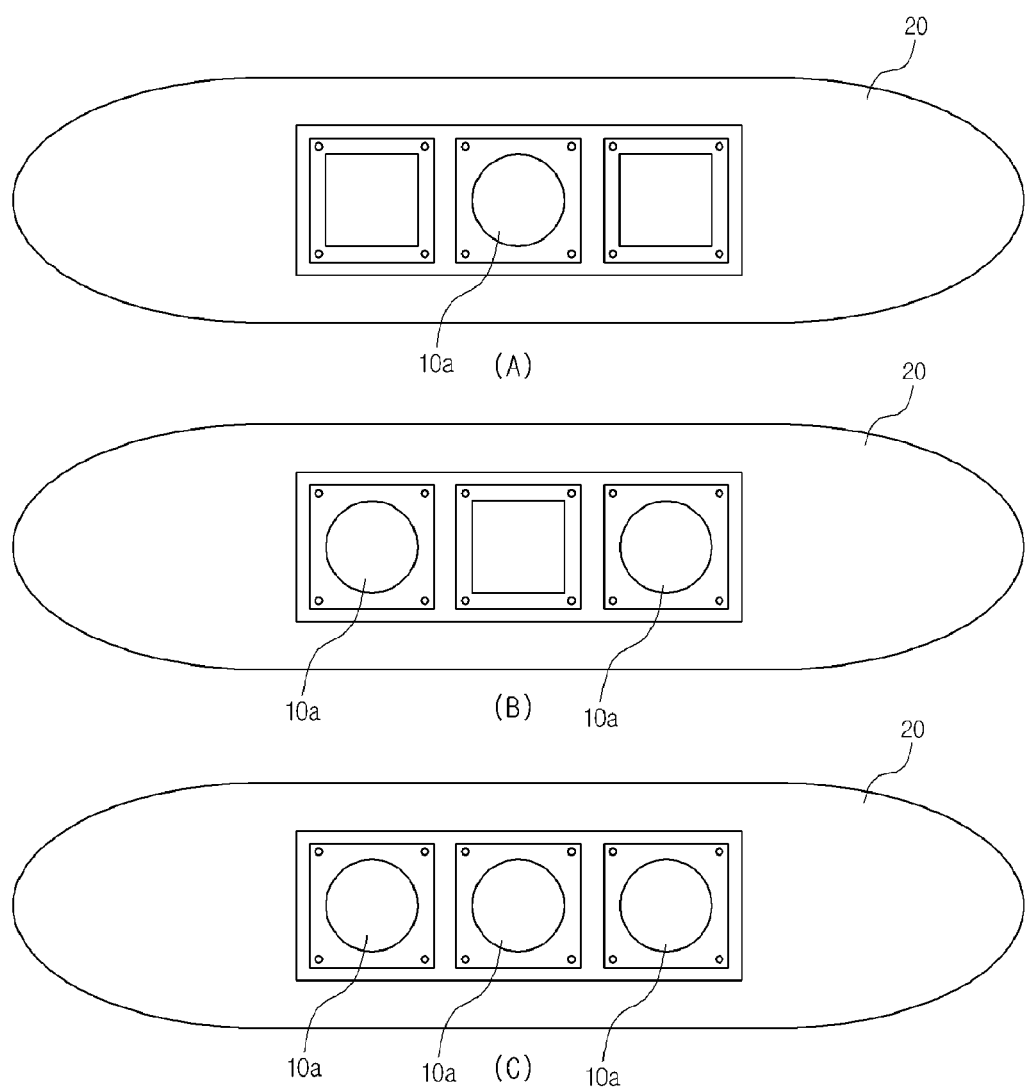
FIG. 5 is a schematic view for explaining a state of selectively separating and coupling a transducer in a structure in which three transducer coupling parts are disposed on the support that is a component of the exemplary embodiment of the present invention.
  A: State in which one transducer is mounted
  B: State in which two transducers are mounted
  C: State in which three transducers are mounted
Figure 6:
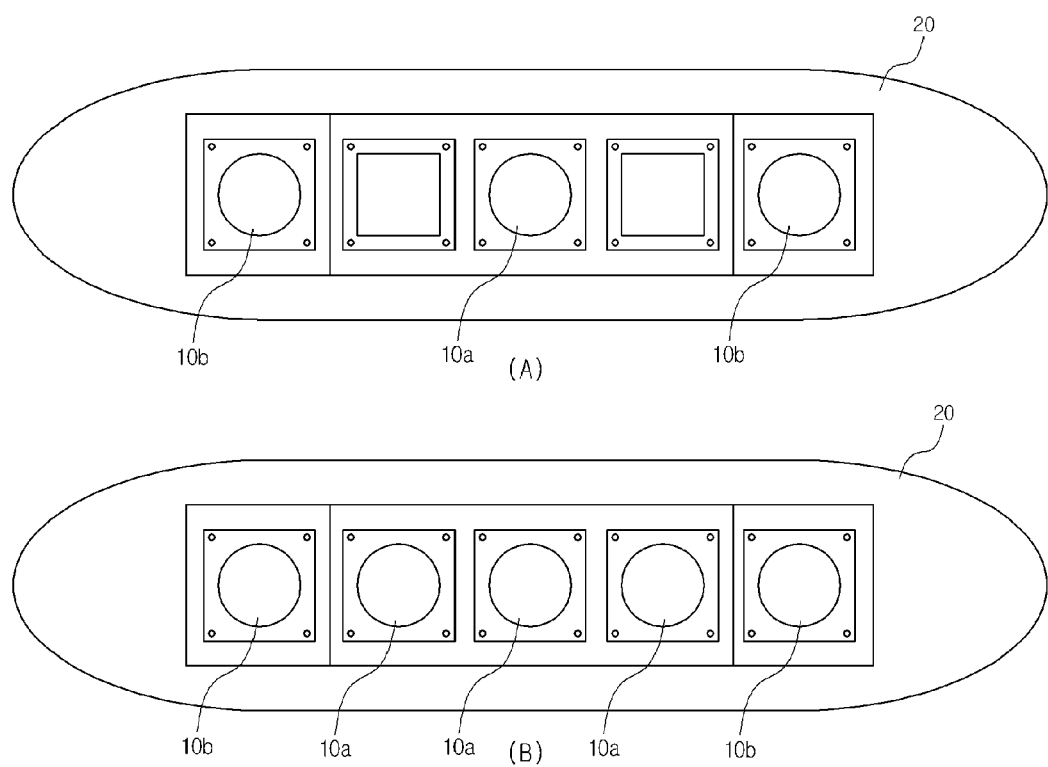
FIG. 6 is a schematic diagram for explaining a state in which the transducers are further provided through the additional mounting frame in the structure of FIG. 5.
  A: State in which one transducer is mounted on the support and the transducers are additionally mounted at the front and the back of the support through the additional mounting frame.
  B: State in which three transducers are mounted on the support and the transducers are additionally mounted at the front and the back of the support through the additional mounting frame.

Hereinafter, a technical idea of the exemplary embodiment of the present invention will be described in more detail with reference to the accompanying drawings.

However, the accompanying drawings are only an example shown for explaining in more detail the technical idea of the present invention and therefore, the technical idea of the present invention is not limited to the accompanying drawings.

The present invention relates to a boomer for marine seismic survey.

Therefore, the boomer according to an exemplary embodiment of the present invention has transducers 10a and 10b that generate a seismic source.

Further, the boomer has a board 20 floating on a surface of water.

A general structure of the boomer is already described in the related art of the specification and has been widely known and therefore, a detailed description of the general structure of the transducers 10a and 10b or the board 20 will be omitted.

However, the exemplary embodiment of the present invention can perform the exploration working in consideration of situations such as exploration purpose, water level, working space, working conditions, or the like, thereby increasing efficiency of marine seismic survey such as obtaining excellent exploration results, solving difficulty in movement and operation, or the like.

To this end, it can be appreciated that the transducers 10a and 10b are implemented to be separated and coupled from and with each other and to mount and use the appropriate number of transducers 10a and 10b according to situations.

For this reason, in the boomer according to the exemplary embodiment of the present invention, a plurality of transducer coupling parts 31 are disposed on the bottom of the board 20 floating on the surface of water so as to separate and couple the transducer 10a from and with each other.

Further, the transducer coupling part 31 is provided with a transducer coupling member 40 for coupling the transducers 10a and 10b.

The above-mentioned transducer coupling part 40 may be implemented in a general bolting form or a general mounting part (a form using a clamp, a form using a magnetic force of a magnet, or the like) that is used to separate and couple two objects.

Since the accompanying drawings show the bolting form, that is, a form in which the transducers 10a and 10b are coupled using a bolt, a bolt fastening hole 41 is formed on the support 30 to be described below.

However, when a phenomenon in which the boomer is inclined occurs according to the separation and coupling of the transducers 10a and 10b, it is difficult to obtain the excellent exploration results even though the marine seismic survey is performed.

As a result, the transducer coupling part 31 according to the exemplary embodiment of the present invention is disposed along a straight line L forming the left and right center of gravity of the board 20 (in the accompanying drawings, having a structure in which the transducer coupling part 31 is disposed along a straight line from the bottom of the straight line).

In the case of the board 20 provided in the boomer according to the related art, a straight line crossing from the front central point of the board 20 to the back center point thereof becomes a straight line forming the left and right center of gravity of the board 20 (the left and right symmetrical object has the above form).

The transducer coupling part 31 in the above-mentioned description is provided in odd number (three, five, seven, or the like).

The reason is that the front and back center of gravity of the boomer is not positioned at a point bisecting a distance from a front end to a rear end of the boomer when an odd number of transducers 10a and 10b are coupled under the conditions that the transducer coupling part 31 is provided in an even number such as two, four, six, or the like, thereby causing a phenomenon in that the boomer floating on the surface of water is inclined forward or backward.

In the exemplary embodiment of the present invention, it is preferable to perform the working in consideration of a state of a sea level such as a wave height, floating matters, or the like, and a water level when considering the accuracy of exploration results.

To this end, the support 30 is disposed on the bottom of the board 20 and the transducer coupling part 31 is disposed on the support 30, wherein the support 30 may be implemented to control a distance from the bottom point of the board 20 to the transducer coupling part 31.

That is, since there are limitations in minimizing the influence of wave or floating matters on the transducers 10a and 10b and appropriately coping with a water level by a control of the coupled number of transducers 10a, it may more appropriately (accurately) cope with the water level by controlling a depth of the transducer 10a down toward the sea floor while controlling the coupled number of transducer 10a.

In the exemplary embodiment of the present invention, there may be a case in which a larger number of transducers 10b than the number of transducer coupling parts 31 that are originally disposed needs to be coupled with each other.

The reason is that there is a limitation in increasing the size of the boomer and it is preferable that the number of transducer coupling parts 31 mounted on the support, or the like, does not generally exceed 7 when considering the easiness of movement and storage.

In order to solve the above-mentioned problem, the boomer may be implemented to further include the additional mounting frame 50 on which the transducer coupling part 51 having the transducer 10b mounted at the bottom thereof so as to be separated and coupled from and with each other at the front of the support 30 or at the back apposite thereto toward the front of the board 20 is disposed.

Preferably, the transducer coupling parts 31 are disposed at both of the front and the back of the support 30 so that the additional mounting frames 50 may be mounted at both of the front and the back of the support 30.

The reason is that it is possible to prevent the boomer from being inclined forward or backward.

That is, when the additional mounting frame 50 having the same weight is disposed at both of the front and the back of the support 30, it is possible to prevent the boomer from being inclined forward or backward in which the boomer floats on the surface of water.

Even though the additional mounting frame 50 is mounted, there is a need to prevent the boomer from being inclined left and right.

To this end, a frame coupling part 32 with which the additional mounting frame 50 is coupled is disposed at the front or the back of the support 30 and the position of the frame coupling part 32 is a point in which the board 20 and the additional mounting frame 50 are coupled with each other in the state in which the transducer coupling part 31 of the additional mounting frame 50 is disposed along a straight line L (alternatively, an extension line of the straight line L) forming the left and right center of gravity of the board 20.

As described above, the coupling member for mounting the additional mounting frame 50 with the frame coupling part 32 may be implemented by applying the known various types for coupling between objects.

However, it is preferable to use the coupling scheme using a bolt so as to easily mount the additional mounting frame 50.

To this end, the bolt fastening hole or a fixed bolt 61 may be disposed at the frame coupling part 32. It is preferable to fix the bolt 61 by a welding, or the like, rather than forming the bolt fastening hole when considering the weight of the additional mounting frame 50, as shown in the accompanying drawings.

As set forth above, the boomer for the marine seismic survey according to the exemplary embodiment of the present invention can be implemented to separate and couple the plurality of transducers from and with each other on the board floating on the surface of water, wherein the transducer coupling part is disposed along a straight line crossing the left and right center of gravity of the board.

Therefore, the exemplary embodiment of the present invention can perform the structural change working controlling the number of provided transducers according to the situations such as the exploration purpose, the water level, the working space, the working conditions, or the like, thereby obtaining excellent exploration results and can solve the difficulty in the movement and operation, thereby increasing the efficiency of the marine seismic survey.

Further, the support is disposed on the bottom of the board and the support on which the transducer coupling part is disposed controls the distance from the bottom point of the board to the transducer coupling part, thereby more precisely performing the working in consideration of the state of the sea level such as the wave height, floating matters, or the like, and the water level.

What is claimed is:

1. A boomer for marine seismic survey having a transducer used for marine seismic survey and generating a seismic source, wherein a plurality of transducer coupling parts 31 capable of separating and coupling a transducer 10a are disposed on a bottom of a board 20 floating on a surface of water, the transducer coupling parts 31 being disposed along a straight line L forming left and right center of gravity of the board 20, and a transducer coupling member 40 for mounting a transducer 10a on the transducer coupling parts 31 is provided, and a support 30 is mounted on the bottom of the board 20, the transducer coupling part 31 is disposed on the support 30, and the support 30 is formed to control a distance from a bottom point of the board 20 to the transducer coupling part 31.

2. The boomer of claim 1, wherein the number of transducer coupling parts 31 disposed on the support 30 is an odd number.

3. The boomer of claim 1, further comprising an additional mounting frame 50 on which the transducer coupling part 51 having the transducer 10b mounted at the bottom thereof so as to be separated and coupled from and with each other at the front of the support 30 toward the front of the board 20 or at the back opposite thereto is disposed, and a frame coupling part 32 with which the additional mounting frame 50 is coupled disposed at the front or the back of the support 30, wherein the position of the frame coupling part 32 is a point in which the board 20 and the additional mounting frame 50 are coupled with each other in a state in which the transducer coupling part 51 of the additional mounting frame 50 is disposed along a straight line L forming the left and right center of gravity of the board 20.

4. The boomer of claim 3, wherein the frame coupling part 32 has a bolt fastening hole or a fixed bolt so as to couple the support 30 with the additional mounting frame 50 by bolting.

* * * * *